Figure 1:
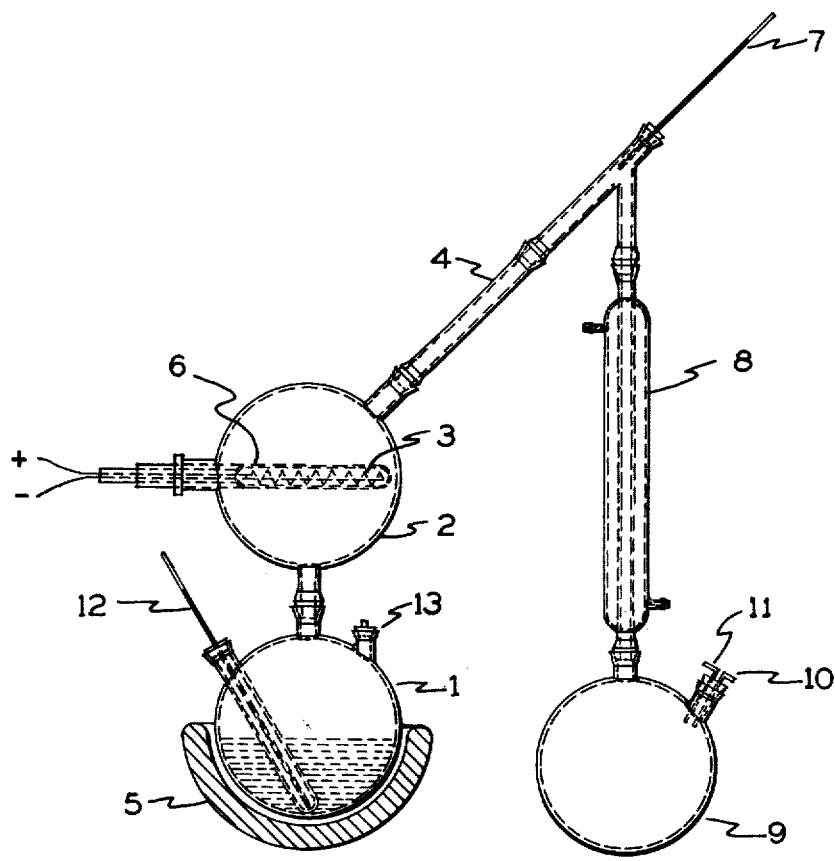

June 18, 1963 R. S. COOPER 3,094,559
METHOD FOR THE PREPARATION OF DIPHENYLPHOSPHINOUS CHLORIDE Filed May 5, 1960

INVENTOR

ROBERT S. COOPER

By Lloyd L. Malone

ATTY.

United States Patent Office 3,094,559
Patented June 18, 1963

3,094,559
METHOD FOR THE PREPARATION OF DIPHENYL-PHOSPHINOUS CHLORIDE
Robert S. Cooper, Park Forest, Ill., assignor to Stauffer Chemical Company, New York, N.Y., a corporation of Delaware
Filed May 5, 1960, Ser. No. 26,987
4 Claims. (Cl. 260—543)

This invention relates to an improved method for the preparation of diphenylphosphinous chloride by pyrolysis of phenylphosphonous dichloride at substantially atmospheric pressure.

The presently known methods of producing diphenylphosphinous chloride are not suitable for commercial scale production of the compound because of the low yields obtained and the difficulties involved in carrying out the reaction procedures. One procedure has been the heating of phenylphosphonous dichloride under pressure in a sealed vessel to effect a substantially reversible disproportionation reaction yielding only about 30% of the desired product. Another such procedure involves the reaction of phosphorus trichloride with benzene zinc chloride in ethyl ether. Again, the yield of diphenylphosphinous chloride was less than 30%.

In accordance with my new procedure yields of over 70% of diphenylphosphinous chloride ar readily obtained by a vapor phase pyrolysis of phenylphosphonous dichloride under controlled temperature and recycling or refluxing conditions.

Uncontrolled pyrolysis of phenylphosphonous dichloride gives a complex mixture of compounds including diphenylphosphinous chloride, triphenylphosphine, diphenyl, phosphorus trichloride, benzene diphosphine chloride, etc. Such mixture is quite difficult to separate into its various components and obviously, this difficulty is the cause of the poor yields of diphenylphosphinous chloride reported in the prior art literature.

In my improved procedure, the phenylphosphonous dichloride is vaporized and the vapors subjected to a pyrolyzing temperature for a brief period and the pyrolysis products separated by fractional condensation.

A typical form of apparatus for the preparation of diphenylphosphinous chloride is illustrated in principle by FIGURE 1. It is obvious that the apparatus may be varied over a wide range without departing from the functional principles illustrated in the drawing of FIGURE 1.

The process is carried out with reference to the illustrated apparatus as follows:

A quantity of commercial grade phenylphosphonous dichloride (purity 95–97% $C_6H_5PCl_2$) was introduced through inlet 13 into flask 1 and heated to a boiling temperature at atmospheric pressure by heating means 5, the vapors of phenylphosphonous dichloride passing into tube or chamber 2 in contact with a hot surface 6 provided in chamber 2 and heated by suitable means (as illustrated by an electric heating coil 3 encased in a silica tube 6). The pyrolysis reaction products resulting from contact with the hot surface 6 together with unreacted phenylphosphonous dichloride are refluxed at boiling temperature 12 into the condenser 4 at such rate as to maintain a temperature at thermometer 7 of not over about 100° C. to permit $PCl_3$ vapors to pass into condenser 8, while the diphenylphosphinous chloride, unreacted phenylphosphonous dichloride and higher boiling reaction products are condensed in condenser 4 and allowed to flow back into flask 1. Phosphorus trichloride liberated by the pyrolysis reaction passes into condenser 8 and is condensed at a temperature not exceeding 76° C. The reaction products returning to flask 1 from the chamber 2 and condenser 4 are reheated to revaporize the returned phenylphosphonous dichloride (B.P. about 225° C.) into chamber 2 while the diphenylphosphinous chloride product which boils at about 320° C. remains in flask 1 in solution in unvaporized phenylphosphonous dichloride. As the concentration of diphenylphosphinous chloride in flask 1 increases, the refluxing temperature of the mixture increases. For practical purposes the reaction is continued until the refluxing temperature of the mixture in flask 1 falls within the range of 250–300° C. preferably within the range of 260–290° C. The whole reaction procedure is carried out under anhydrous and non-oxidizing conditions maintained by the introduction of a dry inert gas (such as nitrogen) into collection chamber 9 through inlet 10. Small amounts of non-condensable gases escape through outlet 11. The residual reaction mixture in flask 1 containing the diphenylphosphinous chloride and higher boiling components is subjected to fractional distillation to recover the diphenylphosphinous chloride product in substantially pure form.

The pyrolysis reaction which takes place in the zone of the hot surface 6 in chamber 2 is effected at temperatures above 400° C., and preferably within the range of 400–700° C. The desired pyrolysis reaction may be expressed by the following equation:

(I)     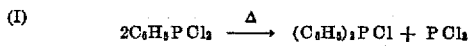

$$2C_6H_5PCl_2 \xrightarrow{\Delta} (C_6H_5)_2PCl + PCl_3$$

The formation of by-products by competing reactions such as:

(II)     $2(C_6H_5)_2PCl \rightarrow (C_6H_5)_3P + C_6H_5PCl_2$ and the production of higher boiling pyrolysis products are kept to a minimum by controlling the refluxing temperature 12 within the range of 250–300° C.

In a typical example, 3100 grams of phenylphosphonous dichloride ($C_6H_5PCl_2$) were refluxed into the reaction chamber while maintaining the surface temperature of the silica tube (heat zone) at about 530° C.±25° C. (calibrated temperature). Refluxing started at 222° C. and gradually increased to a refluxing temperature of 264° C. after 89 hrs. During this time, 900 grams of phosphorus trichloride distilled out of the reaction mixture and was recovered. There remained 2102 grams of a black liquid residue which contained the desired diphenylphosphinous chloride plus some unreacted phenylphosphonous dichloride and undesirable side reaction products. This residual liquid was fractionated at 1–3 mm. Hg pressure. The fraction collected at a vapor temperature of 67° to 81° C. amounting to 614.4 grams was unreacted phenylphosphonous dichloride and was suitable for reuse. A second fraction of 36.0 grams collected at 81°–92° C. of undetermined composition was set aside for reuse. The third fraction collected at 92°–120° C. amounting to 1078.8 grams was the crude diphenylphosphinous chloride product and represented a yield of approximately 72.5% based on the diphenylphosphinous chloride equivalent of the pyrolyzed phenylphosphonous dichloride. On redistillation of this fraction, a 95% recovery of pure diphenylphosphinous chloride was obtained, having a boiling point of 90°–92° C. at 1 mm., an index of refraction $N_D^{25} = 1.6341$ and a density, $d_{25}^{25} = 1.2190$. The fourth fraction collected at 120°–148° C. amounting to 182.6 grams partially solidified on standing and probably contained some triphenyl phosphine by-product. An undistillable residue amounting to 173.8 grams was discarded.

The results of a number of typical laboratory examples are shown in the following table.

Table I

| Example | Mols $C_6H_5PCl_2$ Charged | Pyrolysis Zone, Temp., °C. | Time of Reaction (Hrs.) | Final Reflux, Temp., °C. | $C_6H_5PCl$ Reacted, Percent | Rate of formation of $(C_6H_5)_2PCl$, Grams/hour | Percent Yield of $(C_6H_5)_2PCl$ |
|---|---|---|---|---|---|---|---|
| A | 11.4 | 450 | 162 | 270 | 77 | 4.4 | 72.0 |
| B | 12.1 | 470 | 147 | 268 | 54 | 5.0 | 65.0 |
| C | 17.3 | 500 | 144 | 257 | 64 | 7.0 | 67.0 |
| D | 17.8 | 500 | 100 | 262 | 65 | 10.8 | 83.0 |
| E | 6.2 | 500 | 74 | 262 | 73 | 5.1 | 76.0 |
| F | 17.7 | 500 | 140 | 290 | 88 | 7.8 | 67.0 |
| G | 5.9 | 500 | 76 | 299 | 95 | 5.3 | 68.0 |
| H | 6.2 | 520 | 43 | 300 | 96 | 9.3 | 64.0 |
| I | 17.3 | 530 | 89 | 264 | 78 | 12.1 | 72.5 |
| J | 17.8 | 530 | 93 | 290 | 86 | 12.0 | 70.0 |

These examples show that reasonably good yields of diphenylphosphinous chloride are obtainable by employing pyrolysis zone temperatures within the range of 450°–530° C. while maintaining the refluxing temperature within the range of 250°–300° C. From the table it is quite obvious that the pyrolysis zone temperature range is not critical but does influence the rate of reaction favorably as the temperature is increased. Pyrolysis zone temperatures as high as 700° C. may be used with satisfactory results provided the refluxing temperature is maintained at a temperature below the boiling point of diphenylphosphinous chloride (320° C.) and above the boiling point of phenylphosphonous dichloride (225° C.) and preferably within the narrower range of 260°–290° C. in order to secure higher concentration of the diphenylphosphinous chloride in the refluxing residual liquid without undue concentration of higher boiling by-products.

In a typical pilot plant procedure, phenylphosphonous dichloride was fed to a reboiler still at a rate of 300–500 pounds per hour. Vapor of phenylphosphonous dichloride from the boiler was passed through a hot tube externally heated to a temperature of about 650° C. A portion of the vapors passing through the hot tube are pyrolyzed to phosphorus trichloride and diphenylphosphinous chloride. The phosphorus trichloride vapors are passed into a packed tower condenser and recovered while the higher boiling components of the vapor stream are condensed at a higher temperature and recycled as feed to the reboiler still. Conversion of the phenylphosphonous dichloride amounted to about 5% per pass through the hot tube. When the boiling point of the mixture in the reboiler still increased to 260° C. the reaction was stopped. The crude reaction mixture in the still containing 24.5% phenylphosphonous dichloride, about 63.9% diphenylphosphinous chloride and about 10% of substantially non-volatile by-products, was then fractionally distilled, the phenylphosphonous dichloride being collected for return to the process. Next the diphenylphosphinous chloride was distilled over and recovered in a yield of 86.2% based on the diphenylphosphinous chloride equivalent of the pyrolyzed phenylphosphonous dichloride.

The process may be carried out on a continuous basis by fractionally condensing the stream of vapors from the hot tube or pyrolyzing zone. The vapor stream as it leaves the pyrolyzing zone would contain $PCl_3$, 

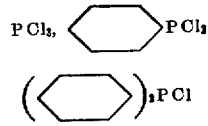

and high boiling or substantially non-volatile by-products. The

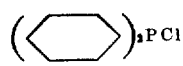

and high boiling fraction may be condensed at temperatures in the order of 250°–300° C. and separately re- distilled to separate and recover the diphenylphosphinous chloride product. The

may be condensed at temperatures in the order of 76°–225° C. and continuously returned to the process for further pyrolysis. The $PCl_3$ condensing at temperatures of less than about 75° C. would be recovered as a useful by-product.

Other variations in procedure may be employed without departing from the scope of the present invention. For example, the pyrolysis reaction products which may be condensed at a temperature above 76° C. can be returned to the reboiler still together with additional quantities of fresh phenylphosphonous dichloride to maintain the boiling point of the reboiler charge at, say 260°–290° C. while continuously withdrawing a portion of the charge and separating the diphenylphosphinous chloride therefrom by separate distillation. The residual mixture may be further distilled and its phenylphosphonous dichloride content recovered and returned to the reboiler still for further subjection to the pyrolysis reaction.

The diphenylphosphinous chloride product has a wide range of known uses. For example, it may be used as an intermediate for the preparation of esters of phosphinous and phosphinic acids, and the preparation of phosphine oxides or sulfides. For example, diphenylphosphinous chloride may be reacted with an alcohol in the presence of pyridine to produce alkyl diphenylphosphinites, which in turn may be oxidized with hydrogen peroxide to give alkyl diphenylphosphinates. J.A.C.S. 77, 3526 (1955). The diphenylphosphinate esters where the alkyl group is replaced with an alkenyl group are shown in U.S. Patent 2,659,714 (Harman et al.) as useful in producing resin polymers and copolymers.

The foregoing description is for clearness of understanding only and no unnecessary limitations should be derived therefrom.

I claim:

1. A method for the preparation of diphenylphosphinous chloride which comprises heating phenylphosphonous dichloride vapors at substantially atmospheric pressure at a pyrolizing temperature of at least about 400° C. to about 700° C. under anhydrous, non-oxidizing conditions, separating diphenylphosphinous chloride and phosphorus trichloride from the pyrolysis reaction products and returning unreacted phenylphosphonous dichloride to the process for further pyrolysis.

2. A method for the preparation of diphenylphosphinous chloride which comprises heating phenylphosphonous dichloride vapors at substantially atmospheric pressure at a pyrolizing temperature of at least about 400° C. to about 700° C. under anhydrous, non-oxidizing conditions, in a reaction chamber, distilling off the phosphorus trichloride formed during the pyrolysis reaction and refluxing the residual higher boiling components until a refluxing temperature within the range of 250° to 300° C. is attained, then separating the accumulated diphenylphosphinous chloride from the residual reaction mixture by fractional distillation.

3. A method for the preparation of diphenylphosphinous chloride which comprises heating phenylphosphonous dichloride vapors at substantially atmospheric pressure at a pyrolizing temperature of 450° to 550° C. under anhydrous, non-oxidizing conditions in a reaction chamber, removing the phosphorus trichloride vapor formed during the pyrolysis reaction and refluxing the residual higher boiling components until a refluxing temperature within the range of 260° to 290° C. is attained, then separating the accumulated diphenylphosphinous chloride from the residual reaction mixture by fractional distillation.

4. A method in accordance with claim 3 wherein a portion of the diphenylphosphinous chloride containing residual reaction mixture is withdrawn, separately fractionated to recover the diphenylphosphinous chloride product, and the higher boiling fraction returned for recycling through the pyrolysis process.

References Cited in the file of this patent
UNITED STATES PATENTS 2,779,787   Higgins et al. _____ Jan. 29, 1957

OTHER REFERENCES

Broglie: Ber. Deut. Chem., vol. 10, p. 628 (1877).
Arbuzov, C. A.: Vol. 44, p. 5832 (1950).
Haber et al.: J.A.C.S, vol 80, pp 2116–2117 (1958).
(Copies in Scientific Library.)

UNITED STATES PATENT OFFICE
CERTIFICATE OF CORRECTION

Patent No. 3,094,559                              June 18, 1963

Robert S. Cooper

It is hereby certified that error appears in the above numbered patent requiring correction and that the said Letters Patent should read as corrected below.

Column 5, line 12, for the claim reference numeral "3" read -- 2 --.

Signed and sealed this 10th day of December 1963.

(SEAL)
Attest:

ERNEST W. SWIDER
Attesting Officer

EDWIN L. REYNOLDS

Acting Commissioner of Patents